(12) United States Patent
Liang et al.

(10) Patent No.: US 6,493,133 B1
(45) Date of Patent: Dec. 10, 2002

(54) SYSTEM AND METHOD FOR INCREASING CAPACITY OF UNDERSEA CABLES

(75) Inventors: Anhui Liang, Eatontown, NJ (US); Chien-Jen Chen, Edison, NJ (US); Bo Pedersen, Annapolis, MD (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 81 days.

(21) Appl. No.: 09/608,755

(22) Filed: Jun. 30, 2000

(51) Int. Cl.⁷ ................................. H01S 3/00

(52) U.S. Cl. ....................... 359/349; 359/337

(58) Field of Search ................. 359/334, 349, 359/337

(56) References Cited

U.S. PATENT DOCUMENTS

| | | | |
|---|---|---|---|
| 5,742,416 A | | 4/1998 | Mizrahi ...................... 359/134 |
| 5,812,306 A | * | 9/1998 | Mizrahi ...................... 359/341 |
| 6,310,716 B1 | * | 10/2001 | Evans et al. ................ 359/334 |

FOREIGN PATENT DOCUMENTS

| | | | |
|---|---|---|---|
| EP | 0841764 | 5/1998 | ........... H04B/10/24 |
| EP | 0936761 | 8/1999 | ........... H04B/10/18 |

* cited by examiner

*Primary Examiner*—Mark Hellner

(57) ABSTRACT

A method of increasing usable bandwidth on a long-haul cable system having at least one optical fiber, the method comprising the steps of: (a) effecting counter-propagating first and second signals of different bands on a common long-haul optical fiber having cascaded optical amplifiers; and (b) band amplifying the first and second signals while reducing BRS in the bands.

38 Claims, 8 Drawing Sheets

SYSTEM AND METHOD FOR INCREASING CAPACITY OF UNDERSEA CABLES

FIELD OF INVENTION

The present invention relates generally to long-haul, fiber optic transmission systems. More particularly, the present invention relates to increasing the capacity of undersea cable systems.

BACKGROUND OF THE INVENTION

An undersea network of fiber-optic telecommunication cables links continents, nations and lands together. Communication traffic on these submarine cables has increased dramatically in recent years and is expected to continue to grow as a result of many factors, including, for example, the globalization of world economies and businesses, the increased demand for international communications capabilities, and the development of multimedia applications and revolutionary resources such as the Internet. These factors necessitate increasing capacity not only by adding cables, but also by optimizing the operation of existing submarine cables. The term "capacity" as used herein refers to the total bit rate of the cable system which represents the sum of the bit rates of each channel on all the fibers within a cable.

Approaches for increasing capacity on existing cables have traditionally been aimed at optimizing bandwidth utilization. Long-haul optical fiber transmission paths, such as those employed by undersea cables, typically extend over 5000 km and operate in the C-band. The C-band spans from about 1525 to about 1565 nm and is optimal for low-absorption losses. Within the C-band, capacity may be increased by increasing the number of channels and the bit rate of the channels. Most long-haul cable systems increase the number of channels through wavelength division multiplexing (WDM). The ultimate capacity of a WDM cable system depends on how closely channels can be packed. Minimum channel spacing is limited, however, by interchannel crosstalk and the degradation of the signal to noise ratio (SNR). It has been found that, to maintain sufficient signal integrity, channel spacing in GHz should exceed, e.g., four times the bit rate in Gb/s. Therefore, for a given bandwidth, the number of channels and bit rate are interrelated and limit the capacity of a cable.

Furthermore, in practice, other factors restrict the use of the entire low-loss bandwidth window of 120 nm near 1550 nm. For example, the number of channels is limited to the bandwidth over which the amplifiers can provide nearly-uniform gain. Other factors that limit the number of channels include nonlinear effects and the tunability of laser transmitters. Therefore, increasing channel bit rate and the number of multiplexed channels is limited by SNR minimums and the current state of the technology.

One approach to increase useable bandwidth involves using the L-band in addition to the C-band. The L-band refers to a bandwidth of about 1570 to about 1610 nm. Combining the L-band with the C-band expands the useable bandwidth from about 1525–1565 (40 nm) to about 1525–1610 nm (80 nm). Use of the L-band has been limited in the past, however, due to several factors, one of the more significant being Raman effects.

In multiple channels systems, the fiber acts as a Raman amplifier such that longer wavelength channels are amplified by shorter wavelength channels when the wavelength difference is within the bandwidth of the Raman gain. The Raman gain of silica fibers is so broad that the amplification can occur for channels spaced as far apart as 200 nm, although the peak amplification occurs between about 110 and about 120 nm from the pump wavelength. The shortest wavelength becomes the most depleted as it can pump many long-wavelength channels simultaneously. It is interesting to note that amplification only occurs when 1 bits are present in both channels simultaneously. This signal-dependent amplification leads to enhanced power fluctuations which add to receiver noise and degrade receiver performance.

The Raman effects between the C- and L-bands are particular problematic compared to the effects within just the C-band, especially in long-haul systems. Given the conventional operating bandwidth within the C-band of less than 40 nm, the Raman effects between channels tend to be insignificant since the peak Raman Stokes shift is about 110 to about 120 nm from the pump wavelength. However, when the C- and L-bands are combined and form a bandwidth of close to 80 nm, the wavelength difference between the shortest and longest channels is quite near the peak Raman Stokes shift.

Aside from Raman effects, combining the C and L-band also is problematic from the standpoint of isolation. More specifically, to isolate bands based on wavelength, a minimum bandgap between them is necessary to maintain the integrity of the channels at the interface of the C- and L-bands. This bandgap tends to be relatively large compared to the spacing between channels and consumes valuable bandwidth thereby reducing capacity.

Therefore, a need exists for increasing capacity on new and existing lines using known technologies while maintaining the integrity of the signals. The present invention fulfills this need among others.

SUMMARY OF INVENTION

The present invention provides an approach for increasing capacity on long-haul cable systems that overcomes the aforementioned problems by employing counter-propagating band signals, preferably, counter-propagating C-band and L-band signals. By using counter-propagating band signals, the Raman effects associated with co-propagating bands are significantly reduced. Applicants suspect that the Raman effects are greatly reduced for counter-propagating signals due to "walk off" and/or "power distribution" effects (described in detail below), although the scope of the present invention is not, in any way, tied to a particular theory. In addition to the benefits of reducing Raman effects, counter-propagating band signals also are more readily isolated. It is more efficient to isolate bands based on their direction of propagation, rather than on their wavelength differences, since a relatively-large bandgap between the bands is not needed to improve the isolation.

In effecting counter-propagating C- and L-band signals on long-haul cable systems, such as undersea cable systems, it has been found that a reduction in backward Rayleigh scattering (BRS) is required. BRS results from random localized variations of the molecular positions in glass that create random inhomogeneities of the reflective index that act as tiny scatters centers. Although BRS is not a problem with counter-propagating band signals over relatively-short transmission paths, such as terrestrial lines of 100–300 km (see, for example, Suzuki et al. Bidirectional Ten-Channel 2.5Gbitls WDM Transmission over 250 km Utilizing 76 nm (1531–1607 nm) Gain-band Bidirectional Erbium-doped Fiber Amplifiers, Optical Amplifiers and Their Applications (IEEE/Lasers and Electro-Optics Society, July 1997)), BRS tends to accumulate on long-hauls systems having many cascaded amplifiers. The BRS causes problems in amplification, especially for the L-band which is particularly susceptible to C-band power induced from the BRS of the C-band signals (see, for example, Massicott et al. Low Noise Operation of EY+Doped Silica Fibre Amplifier Around 1–6 µm (August 1992)). More specifically, as the BRS level rises through accumulation over many amplifiers, it can induce gain and output power fluctuations.

The applicants not only have identified the problems with BRS associated with counter-propagating band signals on long-haul optical fibers, but also have developed a solution. More specifically, it has been found that the cascading effects of BRS can be reduced significantly by isolating and filtering each bandwidth during optical amplification.

The applicants also have developed an approach for isolating and filtering the band signals without incurring high insertion losses and noise figure (NF). More specifically, a novel configuration of bandsplitters is set forth which exploits certain characteristics of bandsplitters. Specifically, a bandsplitter's reflective port has lower insertion loss and NF than its transmission port, while its transmission port has better isolation than its reflective port. Accordingly, in a preferred embodiment, the reflective ports of two or more bandsplitters are used as the "input" into an amplifier system such that each bandsplitter reflects signals of a particular band onto a particular transmission path for amplification. Because the reflective ports are used as the input, the insertion loss and NF are minimized. The transmission ports of the bandsplitters are used as the "output" from the amplifier system such that each bandsplitter transmits the amplified signals of a particular band onto the optical fiber having counter-propagating band signals. Because the transmission port is used as the output, a high level of isolation is achieved before the band signals are transmitted onto the optical fiber. Therefore, the bandsplitter configuration splits and filters band signals while introducing minimal insertion losses and NF and achieving high isolation.

Accordingly, one aspect of the present invention is a method of operating a cable by using counter-propagating bandwidths. In a preferred embodiment, the method comprises the steps of: (a) effecting counter-propagating first and second signals of different bands on a common long-haul optical fiber having cascaded optical amplifiers; and (b) band amplifying the first and second signals while reducing BRS on the optical fiber . As used herein, the term "effecting counter-propagating signals" refers broadly to taking any action or participating in any way that results in signals counter-propagating on a long-haul optical fiber and includes, for example, operating a cable system or any portion thereof to transmit and/or receive signals in opposite directions on the same optical fiber, and operating a cable system to transmit signals on an optical fiber in one direction during one time period (e.g. daytime) and in a reverse direction during another time period (e.g., nighttime).

Another aspect of the present invention is a method for amplifying counter-propagating band signals over a long distance between cable stations. In a preferred embodiment, the method comprises the steps of (a) splitting counter-propagating signals into two or more bands; (b) reducing BRS within each band; (c) amplifying each band; and (d) combining the bands after steps (b) and (c) on an optical fiber to effect counter-propagating signals on the optical fiber. Preferably, a configuration of bandsplitters is used to split and combine the bands.

Yet anther aspect of the invention is an amplification system for amplifying counter-propagating signals on a long-haul cable system. In a preferred embodiment, the amplifier system comprises: (a) band splitting/combining optics configured for splitting counter-propagating signals into two or more bands onto separate transmission paths, and for combining the bands on a common optical fiber; (b) BRS-reduction optics for reducing BRS on each separate transmission path; and (c) at least one gain-band amplifier disposed on each separate transmission path for band amplifying the particular band thereon. Preferably, the band splitting/combining optics comprises a configuration of bandsplitters.

Still another aspect of the present invention is a long-haul cable system that supports counter-propagating signals. In a preferred embodiment, the system comprises: (a) a long-haul optical fiber comprising at least one optical fiber; (b) two or more cable stations connected to the optical fiber; and (c) a plurality of amplifier systems as described above disposed along the optical fiber.

DETAILED DESCRIPTION OF PREFERRED EMBODIMENT

Figure 1:
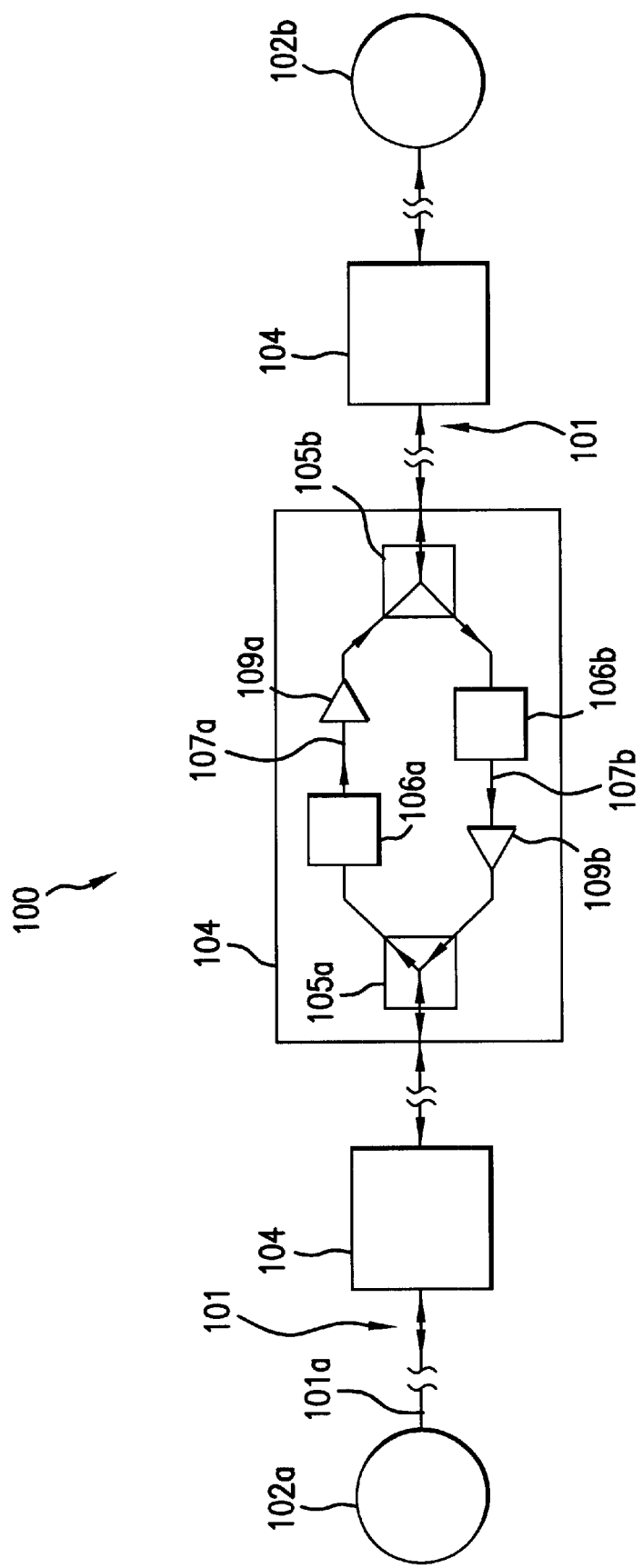
FIG. 1 shows a general system diagram of a preferred embodiment of the cable system of the present invention which supports counter-propagating signals.

The present invention provides a system and method of using counter-propagating signals on an undersea or long-haul cable system to increase the overall usable bandwidth of the optical fiber.

Throughout this disclosure, reference is made to first and second signals of first and second bands counter-propagating in first and second directions, respectively. For purposes of illustration, unless otherwise indicated, the median wavelength of the first band is shorter than that of the second band. In a preferred embodiment, the first band is the C-band and the second band is the L-band, although the scope of the invention is not limited by these designations. The term "counter-propagating" is well known in the art and simply refers to signals moving in opposite directions on a common optical fiber. For illustrative purposes, as used herein, the first direction refers to a signal propagating along an optical fiber from left to right while viewing the optical fiber (or representation thereof) from the side, while the second direction refers to a signal propagating from right to left while viewing the optical fiber (or representation thereof) from the same side. It should be understood that reference to first and second directions is for illustrative purposes only and should not be construed to limit the scope of the invention.

As mentioned in the Summary of the Invention, by using counter-propagating signals, Raman effects between the signals are reduced significantly. The applicants offer several possibilities as to why Raman effects are diminished using counter-propagating signals, although the invention should not be limited in any way to a particular theory. First, in pulse amplification, Raman effects are minimized due to the "walk off" effect encountered in counter-propagating signals. More specifically, as disclosed in G.P. AGRAWAL, NONLINEAR FIBER OPTICS, (Academic Press, Inc., 1995), "walk off" refers to the phenomena when two pulses with different wavelengths separate after collision due to dispersion. The result of walk off is that the Raman effects of a particular higher-frequency signal tend to be averaged over many lower-frequency, counter-propagating signals as the particular higher-frequency signal passes them along the length of the transmission. In contrast, in co-propagating signals, a particular high frequency signal interacts along the length of the transmission with the same low frequency signal, resulting in a disproportional effect between signals since Raman effects are not linear and the interaction only occurs between 1 bit level signals. Thus, using counter-propagating signals avoids constant interaction between the same signals.

Figure 4B:
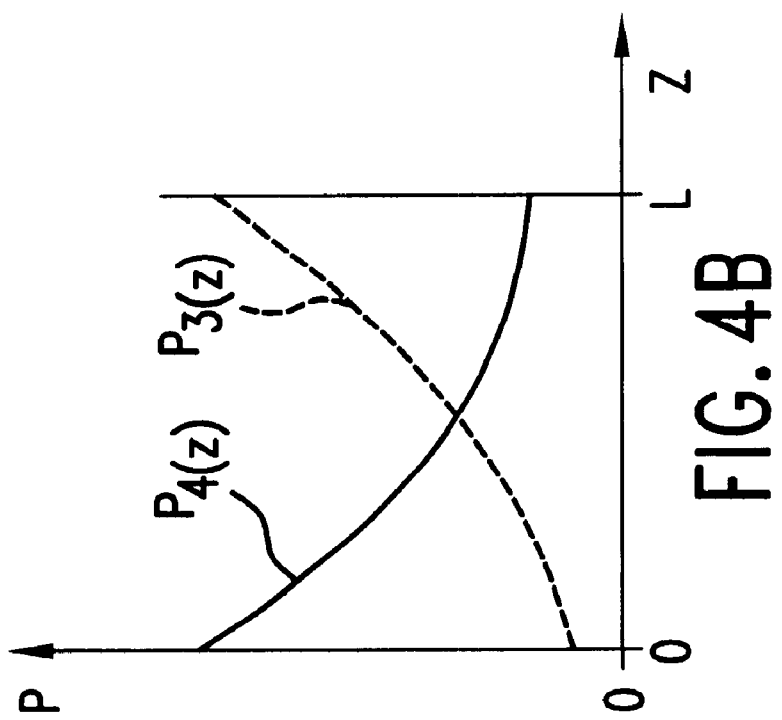
FIGS. 4a & b show the power evolution curves for two continuous wave (cw) co-propagating and counter-propagating signals, respectively, between repeaters.
Figure 4A:
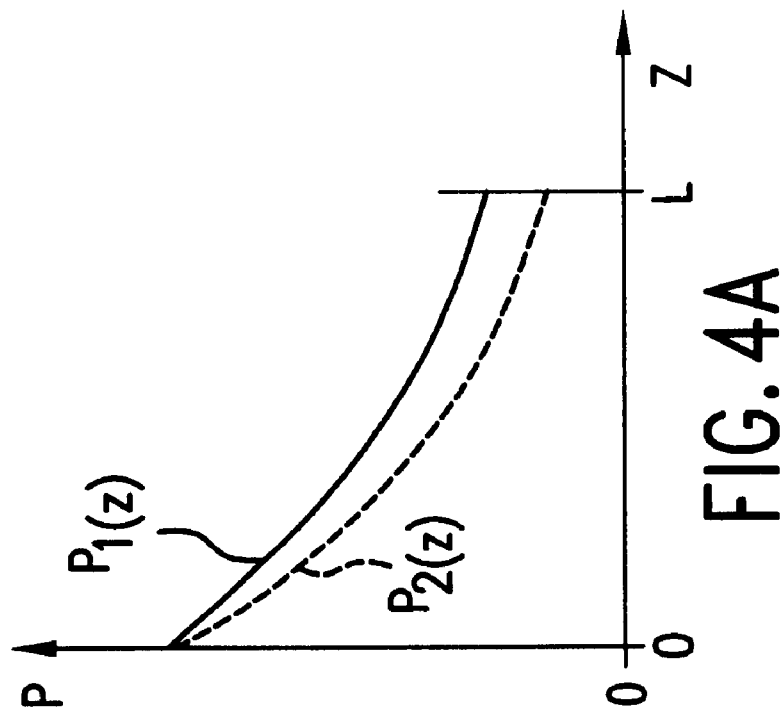

In addition to the "walk off" effect, applicants have identified another possible factor related to a reduction in Raman effects for counter-propagating signals in both pulse and continuous wave (CW) signals and is referred to herein as the "power distribution" effect. More specifically, the applicants have recognized that the product of two signal powers of different wavelengths along the length of the fiber between repeaters has an effect on the Raman interactions of the signals. Integrating the product of the two signal powers over the length of the fiber reveals that a lower integrated product equates to less Raman effects. Referring to the figures, FIGS. 4(a) and (b) show a signal's power level as a function of distance between repeaters for co-propagating and counter-propagating signals respectively. The power of the different signals along the length between repeaters may be represented as follows:

For co-propagating transmissions of FIG. 4(a):

$$\frac{\partial P1(Z)}{\partial Z} = \left[\frac{g}{kA}P2(Z) - \alpha\right]P_1(Z) \quad (1)$$

$$\frac{\partial P2(Z)}{\partial Z} = -\left[\frac{\lambda 1}{\lambda 2}\frac{g}{kA}P1(Z) + \alpha\right]P_2(Z) \quad (2)$$

For counter-propagating transmissions of FIG. 4(b):

$$\frac{\partial P4(Z)}{\partial Z} = \left[\frac{g}{kA}P3(Z) - \alpha\right]P_4(Z) \quad (3)$$

$$\frac{\partial P3(Z)}{\partial Z} = \left[\frac{\lambda_4}{\lambda_3}\frac{g}{kA}P4(Z) + \alpha\right]P_3(Z) \quad (4)$$

where:

L is the repeater spacing;

$P_1(z)$ and $P_2(z)$ are powers at wavelength $\lambda_1$ and $\lambda_2$, respectively, for co-propagating signals, where $\lambda_1 > \lambda_2$, $P_3(z)$ and $P_4(z)$ are powers at wavelength $\lambda_3$ and $\lambda_4$, respectively, for counter-propagating signals where $\lambda_3 < \lambda_4$.

g is the Raman gain coefficient, where $$g = (\lambda_1 - \lambda_2)/\Delta\lambda_p \cdot g_p = (\lambda_4 - \lambda_3)/\Delta\lambda_p \cdot g_p,$$

where $g_p$ is the Raman gain peak coefficient;
$g_p = 7 \times 10^{-14}$ m/w; and $\Delta\lambda_p$, is the difference between the pump and the Raman gain peak;

α is fiber loss;

A is effective area; and k is a parameter related to polarization (k=2 for scrambled polarization)

Let $P_1(z) = q_l(z)e^{-\alpha z}$, $P_2(z) = q_s(z)e^{-\alpha z}$, $P_3(z) = q_s(z)e^{(\alpha z - \alpha L)}$, and $P_4(z) = q_l(z)e^{(-\alpha z)}$, where $q_s$ and $q_l$ are normalized powers which account for the power change induced by the Raman effect. For example, set $\lambda_1 = \lambda_4 = 1610$ nm, $\lambda_2 = \lambda_3 = 1525$ nm, and $A = 50$ $\mu m^2$, and assume an output power of EDFA of −2 dBm/channel, i.e., $q_1(0) = q_s(0) = -2$ dBm. Solving, α=0.21 dB/km.

Figure 5A:
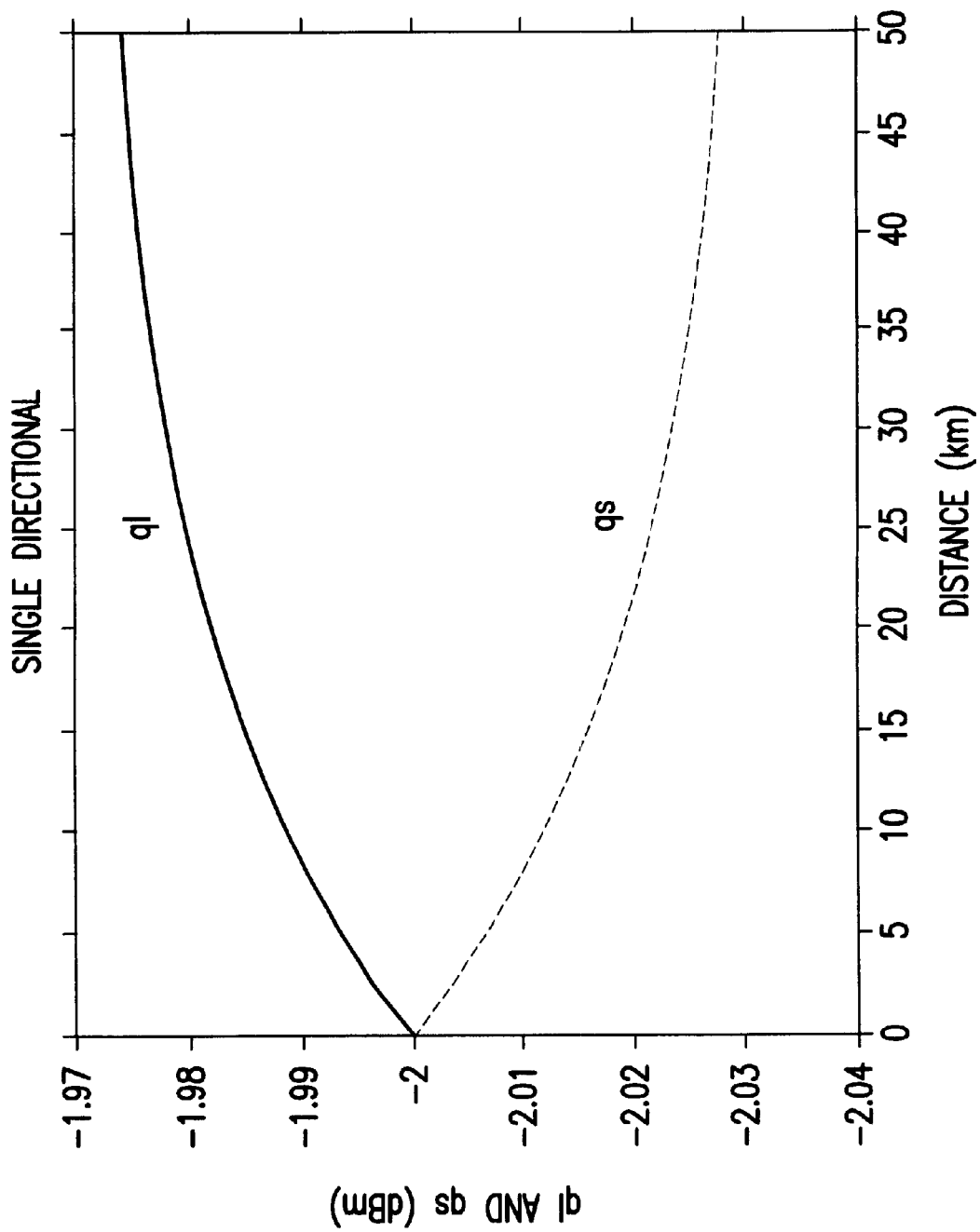
FIGS. 5a & b shown show normalized powers which account for the power change induced by the Raman effect for long and short wavelengths, $q_l$ and $q_s$, within one EDFA span for two continuous wave (CW) co-propagating and counter-propagating signals, respectively.
Figure 5B:
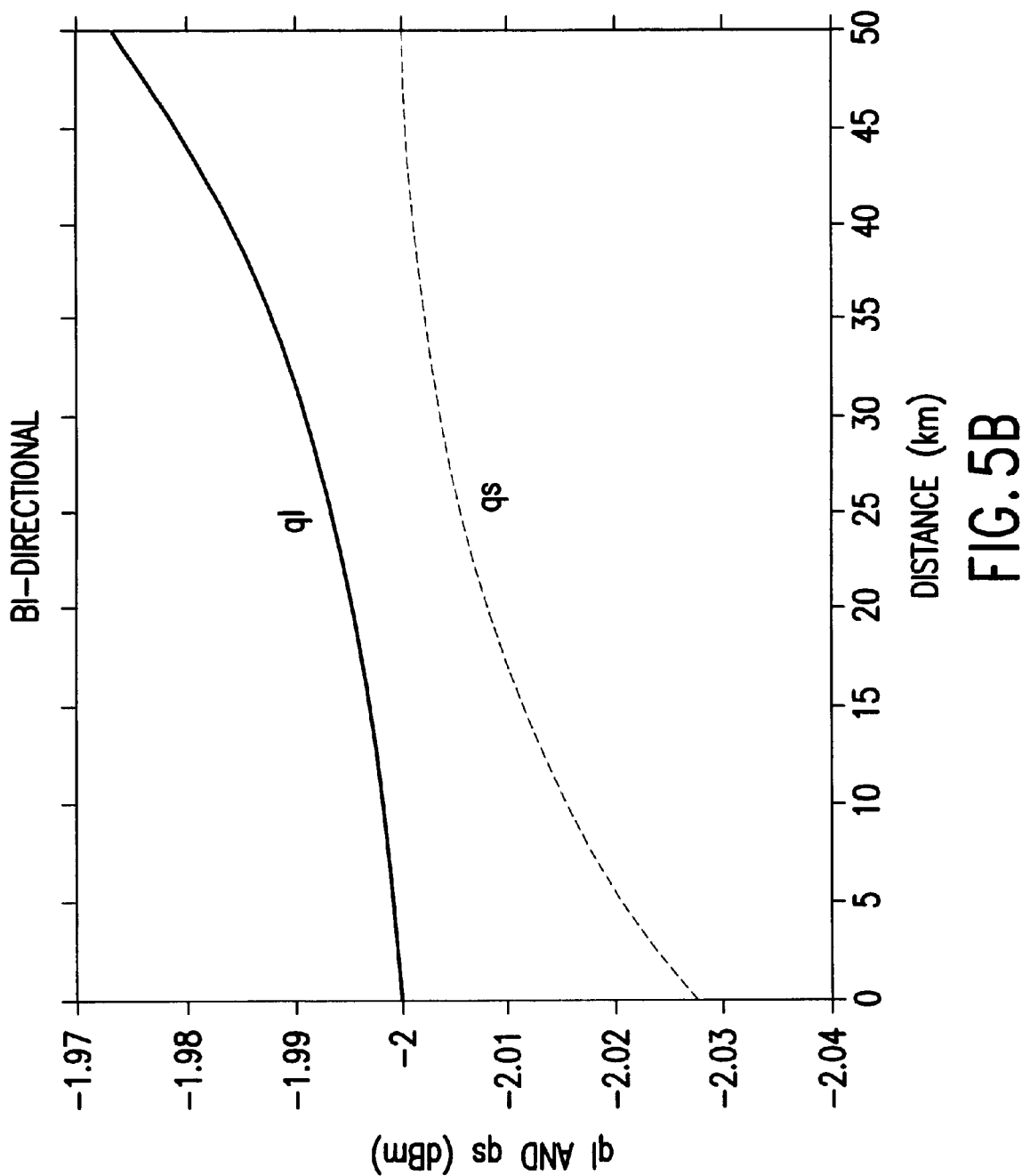

FIGS. 5(a) and (b) show $q_l$ and $q_s$ within one EDFA span for co-propagating and counter-propagating signals, respectively.

Figure 6A:
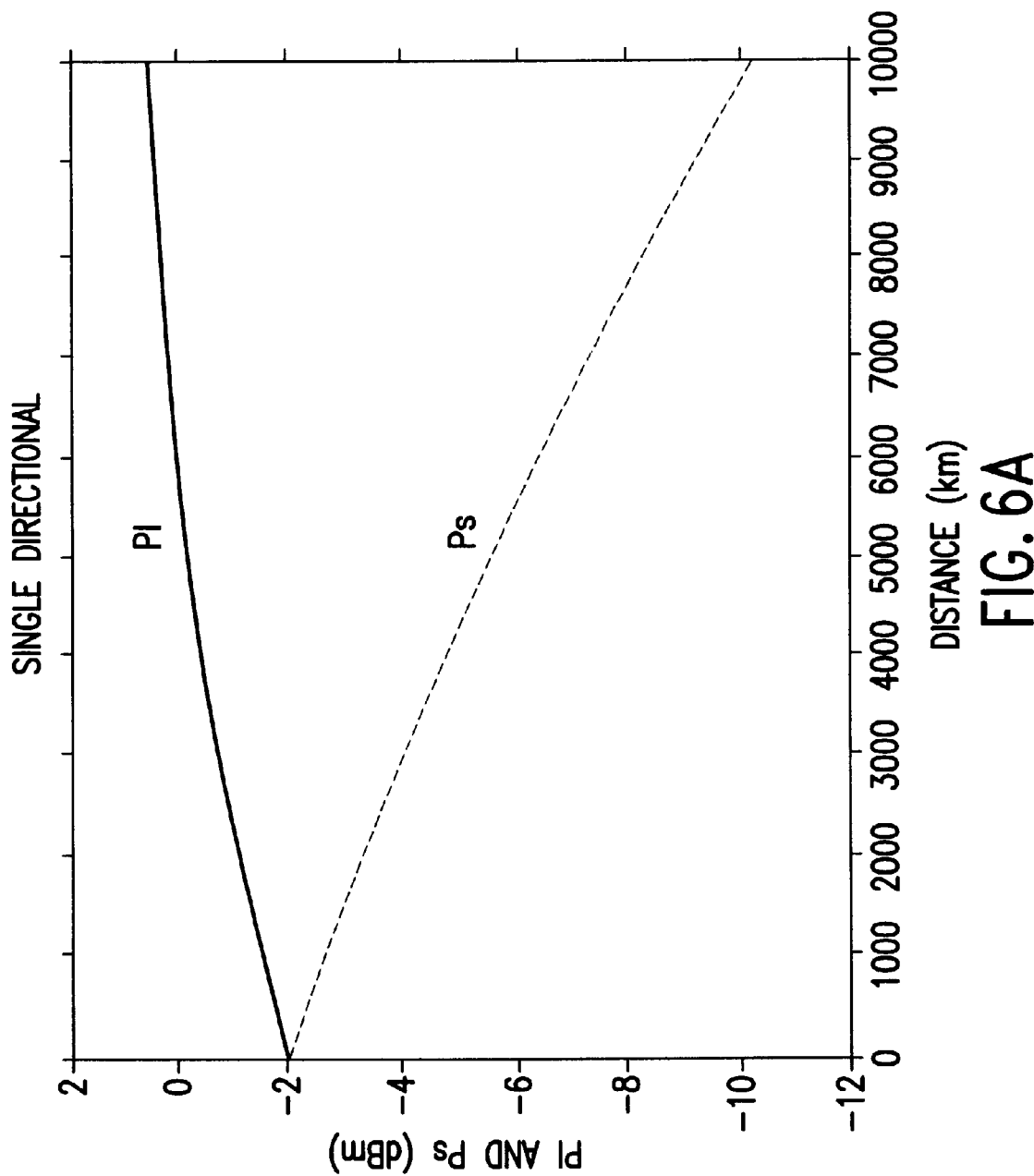
FIGS. 6a & b show the long and short wavelength output power of each EDFA over 10,000 km for co-propagating and counter-propagating signals, respectively.
Figure 6B:
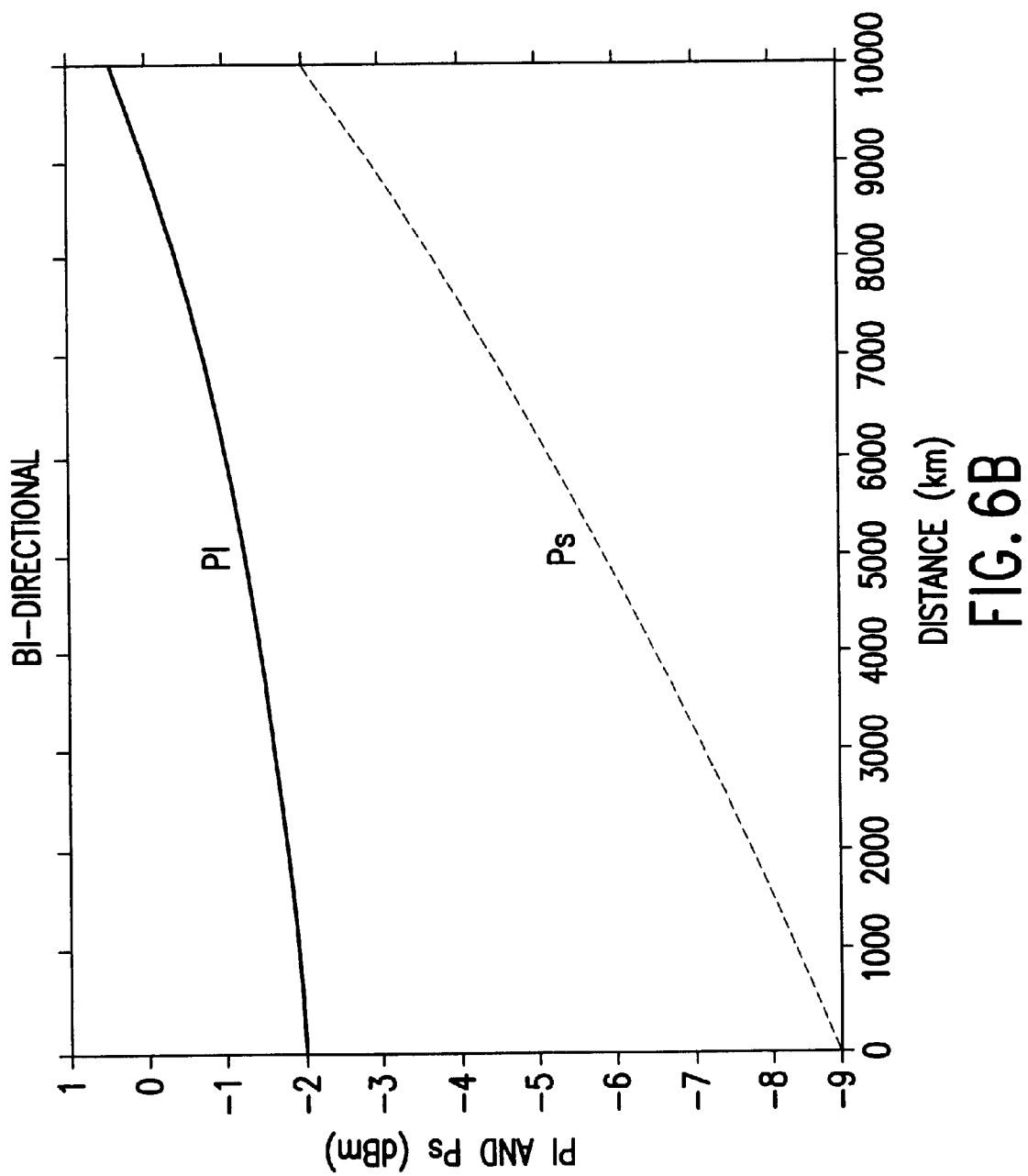

FIGS. 6(a) and (b) show $P_1$ and $P_s$ over 10,000 km co-propagating and counter-propagating signals, respectively, where $P_1$ and $P_s$ are the longer and shorter wavelength output power of each EDFA. After 10,000 km transmission, the Raman effects for counter-propagating transmissions are less than those of co-propagating transmissions, specifically, 1.33 dB less at the shorter wavelength and 0.12 dB less at the longer wavelength. Therefore, by using counter-propagating signals, Raman effects are reduced and the usable bandwidth of a cable system is increased. It should be understood that only two wavelengths were considered in this example and that the difference between the Raman effects of the counter-propagating and co-propagating transmission becomes greater as the number of channels increases. Furthermore, in this example, it was assumed that the gain is always fixed at all wavelengths (e.g., always 10.5 dB), although in a real system, the gain may be different at different wavelengths.

FIG. 1 shows a high-level schematic diagram of a cable system 100 employing the counter-propagating signal approach of the present invention. System 100 comprises at least one long-haul optical fiber 101 having a plurality of optical fibers 101a. Optical signals are transmitted and received by cable stations 102a and 102b on either side of the cable 101. Along the length of cable 101 are optical amplifier systems 104 which are typically spaced from about 20 to about 70 km apart. Amplifier systems 104 are configured to support counter-propagating first and second signals of the first and second bands, respectively.

As shown, the optical amplifier system 104 comprises band splitting/combining mechanisms 105a, 105b, where band splitting/combining mechanism 105a is upstream of band splitting/combining mechanism 105b relative to the propagation of the first signal. The band splitting/combining mechanisms preferably function both (1) to split bands of counter-propagating signals on an optical fiber 101a into discrete bands on separate optical fibers 107a, 107b, and (2) to combine the separate bands on another segment of the optical fiber 101a. The band splitting/combining mechanism may comprise any known or later-developed device that separates bands based on their direction of propagation and/or wavelength. Suitable band splitting/combining mechanisms include, for example, band splitters and circulators.

An important function of the amplifier system is performed by BRS reduction mechanisms 106a, 106b for each band, which reduce the level of BRS of the counter-propagating bands plus any BRS occurring in its band. As mentioned above in the Summary of the Invention, the applicants have recognized that the effect of BRS caused by cascaded band-amplifications between cable stations would be problematic in long-haul systems, reducing the SNR to unacceptable levels if left unchecked. By reducing BRS, however, the saturation effects of cascaded amplifiers are diminished to the extent that acceptable SNR values are achieved. The BRS reduction device may comprise any known or later-developed device that filters or otherwise minimizes the propagation of BRS based on its direction of propagation and/or wavelength. Suitable BRS reduction devices include, for example, isolators and filters.

The amplifier system 104 also comprises band amplifiers 109a and 109b which amplify the band on each fiber 107a and 107b, respectively. Although only one band amplifier is shown on each discrete fiber, a plurality of amplifiers may be used. The band amplifier may comprise any device known or later-developed that optically amplifies a band of signals with suitable flatness across the band such that signal strengths are not excessively distorted between repeaters. Excessive distortion is readily determinable by one skilled in the art based upon the number of cascaded amplifiers and the tolerance cable landing receiving equipment. Suitable amplifiers are known in the art and include, for example, EDFA amplifiers and/or Raman amplifiers.

In operation, the band splitting/combining mechanism 105a splits C-band signals propagating in the first direction from the common optical fiber 101a onto a discrete fiber 107a prior to amplification. Likewise, the band splitting/combining mechanism 105b splits L-band signals counter-propagating in the second direction onto a discrete fiber 107b prior to amplification. BRS reduction devices 106a, 106b on discrete fibers 107a and 107b reduce the levels BRS induced by the L-band signals and C-band signals, respectively. Next, the C-band and L-band signals are amplified in band amplifiers 109a, 109b, respectively. The amplified C-band and L-band signals are then combined on a common optical fiber 101a by band splitting/combining mechanisms 105b, 105a, respectively.

It should be understood that the compartmentalization of the functionality of the amplifier system 104 described in FIG. 1 is for illustrative purposes and should not be construed to limit the scope of the claimed invention. Certain functions may be integrated into single components or the functions may be allocated among a number of discrete components. For example, the splitting and combining functions could be performed using discrete components, and the BRS reducing functions may be performed using a single component. Additionally, it should be understood that the sequence of reducing BRS and amplifying may be interchangeable and additional filters and amplifiers may be used on each discrete fiber without departing from the present invention.

According to the present invention, cascaded band amplifiers for counter-propagating band signals may be used on a long-haul cable system while avoiding the negative effects of BRS. Consequently, the cable system of present invention can accommodate the high number of cascaded optical amplifiers between repeaters typical of long-haul systems. For example, in a typical long-haul system, there may be 25 to 100 or more amplifiers between cable stations, allowing the distance between cable stations to exceed 1,000 to 2,000 km or more.

Figure 2A:
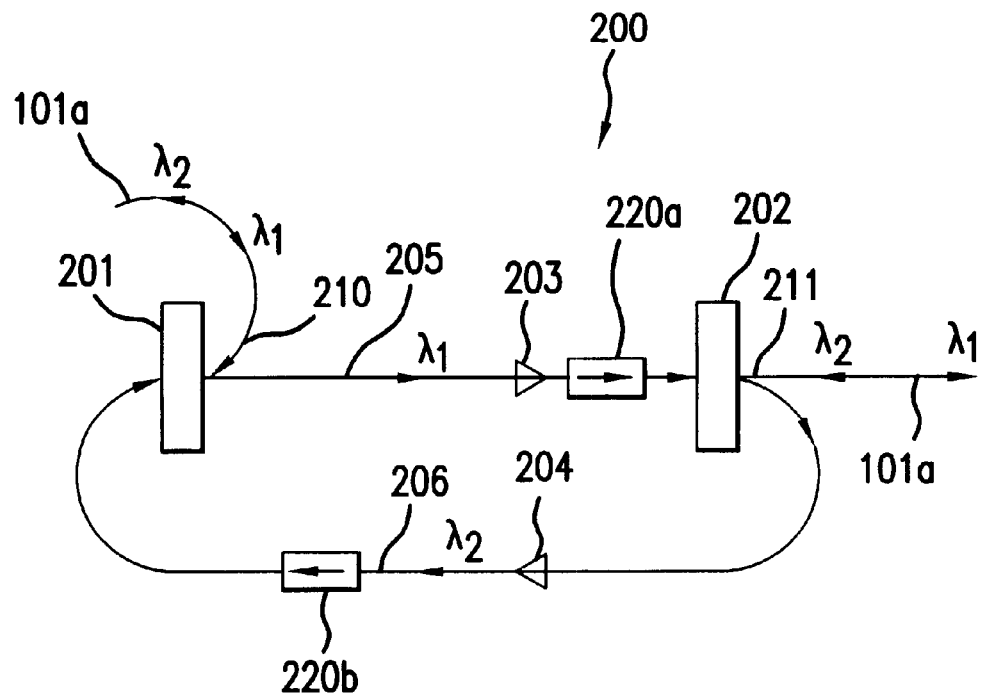
FIG. 2a shows a preferred embodiment of the amplifier system of the present invention for reducing BRS and amplifying counter-propagating signals over long-haul systems using bandsplitters and isolators.

Referring back to the drawings, FIG. 2a depicts a schematic diagram of a preferred embodiment of the amplifier system 104. This embodiment uses bandsplitters to perform the functions of isolating, filtering and combining the counter propagating C-band and L-band signals. A typical bandsplitter comprises a reflective port, a transmission port and a common port, and is configured to transmit only a certain bandwidth and to reflect all other wavelengths. In operation, if input signals of two different bands are coupled to the common port of a bandsplitter configured to transmit one of the bands, that band will be transmitted and the other will be reflected through the reflection port. In a similar way, if input signals of two bands are coupled to the transmission port of a bandsplitter which is configured to transmit only one of the bands, that one band will be transmitted to the optical fiber connected to the common port while the other band will be reflected through the reflection port.

The amplifier system 200 shown in FIG. 2a comprises an L-band-pass bandsplitter 201 and a C-band-pass bandsplitter 202, wherein the L-band-pass bandsplitter 201 is upstream of the C-band-pass bandsplitter 202 relative to the propagation of the C-band signals. The end of one section 210 of optical fiber 101a is coupled to the reflective port of the L-band-pass bandsplitter while the end of another section 211 of optical fiber 101a is connected to the reflective port of C-band-pass bandsplitter 202. Discrete optical fibers 205 and 206 connect the bandsplitters. Specifically, optical fiber 205 couples the reflection port of L-band-pass bandsplitter 201 to the transmission port of the C-band-pass bandsplitter 202 such that L-band signals are transmitted and by the C-band-pass bandsplitter 202 and combined with section 211 of optical fiber 101a. Likewise, optical fiber 206 couples the reflection port of C-band-pass bandsplitter 202 to the transmission port of the L-band-pass bandsplitter 201 such that C-band signals are transmitted and filtered by the L-band-pass bandsplitter 201 and combined with the section 210 of optical fiber 101a. Accordingly, bandsplitters split counter-propagating signals and combine the counter-propagating signals on a single fiber. For example, with respect to L-band-pass bandsplitter 201, it serves to split the C-band signals from the co-propagating L-band on the optical fiber 101a and also serves to combine L-band entering through its transmission port with the optical fiber 101a. Suitable bandsplitters are known in the art and are commercially-available from, for example, JDSU as Part Nos. WD1515C-LUP8AD2 (C-band-pass bandsplitter) and WD1515L-LUP8AD2 (L-band-pass bandsplitter.)

As shown in FIG. 2a, to reduce BRS and reflection from the bandsplitters and. fiber, isolators 220a and 220b are employed on discrete fibers 205 and 206, respectively.

Figure 2B:
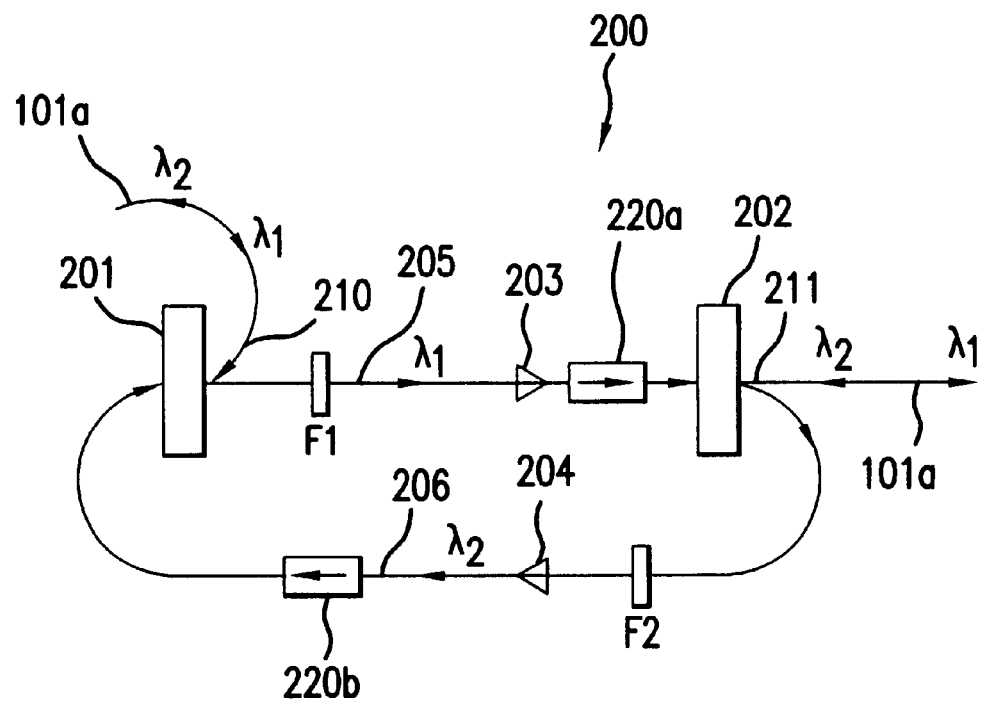
FIG. 2b shows an amplifier similar to that of FIG. 2a but with optional filters F1 & F2.

Optionally, as shown in FIG. 2b, one or more filters F1 and F2 may be disposed on the discrete fibers 205 and 206, respectively, to increase the degree of filtering of the signal and further reduce the level of BRS. Although the-amplifier system of FIG. 2 is shown with one filter on each discrete fiber 205, 206, the invention may be practiced with just one filter on either side of the amplifier of each discrete fiber, or with a plurality of filters on either side or both sides of the amplifier. Suitable filters are known in the art and are commercially-available from, for example, JDSU.

In operation, C-band signals propagating in the first direction on the portion 210 of optical fiber 101a are coupled to the common port of the L-band-pass bandsplitter 201. Accordingly, C-band signals are reflected from bandsplitter 201 onto discrete fiber 205. An optical amplifier 203 is configured to band amplify C-band signals. The isolator 220a eliminates or reduces BRS and other light being reflective from the C-band-pass bandsplitter 202 and from the transmission fiber. The amplified C-band signals are then coupled to the transmission port of the C-band-pass bandsplitter 202. The C-band-pass bandsplitter 202 transmits the amplified C-band signals through the common port thereby filtering them and combining them with counter-propagating L-band signals on section 211 of the optical fiber 101*a*. Likewise, L-band signals propagating in the second direction are coupled to the common port of L-band-pass bandsplitter 202 where they are reflected onto discrete fiber 206. These signals then are band amplified by amplifier 204 using conventional means and coupled to the transmission port of L-band-pass bandsplitter 201. The bandsplitter 201 filters the amplified L-band-signals before combining them with counter-propagating C-band-signals on section 210 of optical fiber 101*a*. Optionally, as shown in FIG. 2*b*, filters F1 and F2 on discrete fiber 206 and 205 may be used to filter C-band signals and L-band signals, respectively, if a greater reduction in BRS is desired.

This bandsplitter configurations of FIGS. 2*a* and 2*b* are particularly preferred because they exploit the advantages of the bandsplitters while avoiding their shortcomings. More specifically, the applicants have recognized that the reflective port has lower insertion loss, lower PDL, and better flatness than the transmission port, while the transmission port has finer filtering/band isolation than the transmission port. The present invention takes advantage of the counter-propagating signals by using the reflective port as an input into the amplifier system and using the transmission port as an output from the amplifier system. Although the amplifier configuration of FIG. 2 is preferred, multiple combinations of bandsplitters are possible within the scope of the present invention. For example, the transmission port may be used as an input into the amplifier system and the reflective port used as an output.

Figure 3:
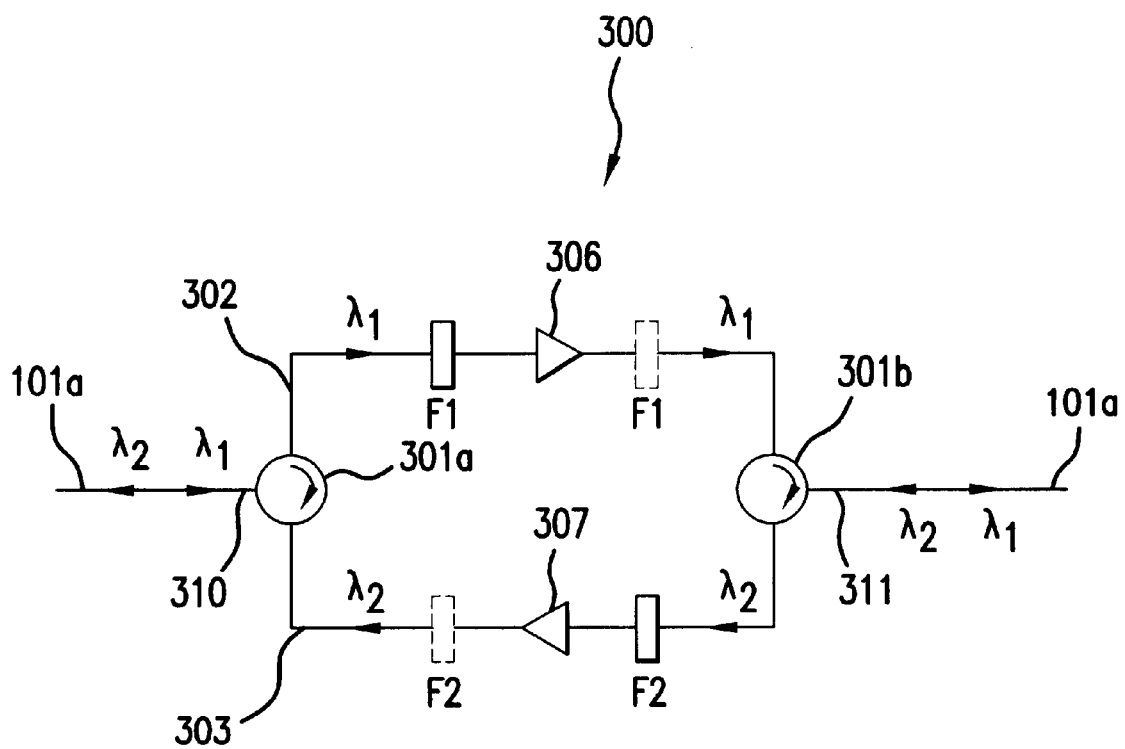
FIG. 3 shows other preferred embodiment of the amplifier system of the present invention for reducing BRS and amplifying counter-propagating signals over long hauls using a combination of circulators and optional filters (optional filters are depicted with dotted lines).

In another embodiment, rather than relying on bandsplitters to effect the splitting and combining of the C- and L-bands, circulators 301*a* and 301*b* can be used as schematically represented in the optical amplifier system 300 shown in FIG. 3. Circulator 301*a* serves to split C-band signals propagating on section 310 of optical fiber 310*a* in the first direction onto a discrete fiber 302 and to combine L-band signals propagating on a discrete fiber 303 in the second direction with C-band signals on section 310. Likewise, circulator 301*b* serves to split L-band signals propagating on section 311 of optical fiber 101*a* in the second direction onto discrete fiber 303 and to combine C-band signals propagating on discrete fiber 302 in the first direction with L-band signals on section 311.

One or more filters F1 and F2 are also disposed on discrete fibers 302 and 303, respectively, to reduce BRS. Filter F1 is a C-band-pass filter and filter F2 is an L-band-pass filter. Although the amplifier system of FIG. 3 is shown with two filters on each discrete fiber 302, 303, the invention may be practiced with just one filter on either side of the amplifier of each discrete fiber, or with a plurality of filters on either side or both sides of the amplifier. Preferably, however, at a minimum, F1 and F2 are disposed on discrete fibers 302, 303 before amplifiers 306, 307, respectively.

Optical band amplifiers 306, 307 are disposed on discrete fibers 302 and 303 respectively. As with the embodiment in FIG. 2, optical amplifiers 306 and 307 are well known in the art.

In operation, C-band signals propagating in the first direction are directed on discrete fiber 302 by circulator 301*a* where they are then filtered by filter F1 to eliminate or reduce BRS and other noise. Next, band amplifier 306 amplifies the signals. The amplified C-band signals may be subject to additional filtering before they are combined with optical fiber 101*a* by circulator 301*b*. Likewise, L-band signals counter-propagating in the second direction on optical fiber 101*a* are directed to discrete fiber 303 by circulator 301*b* where they are filtered by Filter F2 to remove or reduce BRS and other noise. The filtered signals are then amplified in band amplifier 307. The amplified signal may undergo additional filtering before being combined with fiber 101*a* by circulator 301*a*.

What is claimed is:

1. A method of increasing usable bandwidth on a long-haul cable system having at least one optical fiber, said method comprising the steps of:
    (a) effecting counter-propagating first-band signals and second-band signals on a common long-haul optical fiber having cascaded optical amplifiers; and
    (b) band amplifying said first-band signals and said second-band signals in separate optical amplifiers while reducing the level of BRS on said optical fiber.

2. The method of claim 1, wherein said first-band signals have wavelengths shorter than those of said second-band signals.

3. The method of claim 2, wherein said first band is the C-band and said second band is the L-band.

4. The method of claim 1, wherein step (b) is performed at least about 20 times between transmitting and receiving said signals.

5. The method of claim 1, wherein step (b) comprises:
    (i) splitting said first-band signals from said optical fiber to form segregated first-band signals;
    (ii) reducing the level of BRS of said second-band signals in said segregated first-band signals;
    (iii) amplifying said segregated first-band signals; and
    (iv) combining said segregated first-band signals with said optical fiber after steps
    (ii) and (iii).

6. The method of claim 5, wherein steps (i) and (iv) are performed using circulators.

7. The method of claim 5, wherein steps (i) and (iv) are performed using a configuration of two or more bandsplitters.

8. The method of claim 7,
    wherein said bandsplitters comprise a first-band pass bandsplitter and a second-band pass bandsplitter, each bandsplitter comprises a reflective port, a transmission port and a common a port, and
    wherein step (i) comprises splitting said first-band signals from said optical fiber using the reflective port of said second-band pass bandsplitter and splitting said second-band signals from said optical fiber using the reflective port of said first-band pass bandsplitter; and step (iv) comprises combining said split first-band signals with said optical fiber using the transmission port of said first-band pass bandsplitter and combining said split second-band signals with said optical fiber using the transmission port of said second-band pass bandsplitter.

9. The method of claim 8, wherein step (ii) comprises using isolators to isolate said segregated first and second-band signals.

10. The method of claim 1, wherein step (b) comprises:
    (i) splitting said first-band signals and said second-band signals onto discrete fibers;
    (ii) filtering BRS on each of said discrete fibers;

(iii) band amplifying each signal band on each discrete fiber; and (iv) combining said first-band signals and said second-band signals on said optical fiber after steps (ii) and (iii).

11. An undersea cable system comprising:

an undersea cable comprising at least one optical fiber for supporting counter-propagating signals of different bands;

a plurality of amplifier systems, each system comprising:
splitter/combining optics coupled to said optical fiber and being adapted for splitting said counter-propagating signals of different bands onto separate transmission paths, and for separately amplifying said signals on said transmission paths in separate optical amplifiers, and for combining said signals from said separate transmission paths onto said optical fiber after amplification;

BRS reducing optics for reducing BRS of one or more of said signals; and at least one band amplifier for band amplifying said signals.

12. The cable system of claim 11, wherein one band is the C-band and another band is the L-band.

13. The cable system of claim 11, wherein said splitting/combining optics comprise at least a first-band-pass bandsplitter and a second-band-pass bandsplitter interconnected by connecting fibers.

14. The cable system of claim 13,
wherein an end of a first section of said optical fiber is coupled to a reflective port of said second band-pass bandsplitter and an end of a second section of said optical fiber is coupled to a reflective port of said first band-pass bandsplitter;

wherein said connecting fibers provide a transmission path from said reflective port of said second band-pass bandsplitter to a transmission port of said first band-pass bandsplitter and a transmission path from said reflective port of said first band-pass bandsplitter to a transmission port of said second band-pass bandsplitter; and wherein said second band-pass bandsplitter is upstream of said first signal pass bandsplitter relative to the propagation of said first band signal.

15. The cable system of claim 14, wherein said BRS reducing optics comprises one or more isolators on each of said transmission paths.

16. The cable system of claim 15, wherein BRS reducing optics further comprises filters on one or more of said transmission paths.

17. The cable system of claim 11, wherein the splitter/combining optics comprises circulators.

18. The cable system of claim 11, wherein said submarine cable system comprises at least 20 cascaded amplification systems.

19. The cable system of claim 11, wherein said system further comprises a cable landing station connected to each end of said fiber, where said stations are at least about 1,000 km apart.

20. The cable system of claim 11, wherein said optical cable is at least about 1,000 km in length.

21. An amplifier system for an undersea cable system comprising:
splitter/combining optics coupled to said optical fiber and being adapted for splitting said counter-propagating signals of different bands onto separate transmission paths, and for separately amplifying said signals on said transmission paths in separate optical amplifiers, and for combining said signals from said separate transmission paths onto said optical fiber after amplification;

BRS reducing optics for reducing BRS of one or more of said signals; and at least one band amplifier for band amplifying said signals.

22. A method of increasing usable bandwidth on a long-haul cable system having at least one optical fiber, said method comprising the steps of:

(a) effecting counter-propagating first-band signals and second-band signals on a common long-haul optical fiber having cascaded optical amplifiers; and (b) band amplifying said first-band signals and said second-band signals while reducing the level of BRS on said optical fiber;

wherein said first band signals are within the C-band and have wavelengths shorter than those of said second-band signals, which are within the L-band.

23. The method of claim 22, wherein step (b) is performed at least about 20 times between transmitting and receiving said signals.

24. The method of claim 22, wherein step (b) comprises:
(i) splitting said first-band signals from said optical fiber to form split first-band signals;
(ii) reducing the level of BRS of said second-band signals in said split first-band signals;
(iii) amplifying said split first-band signals; and
(iv) combining said split first-band signals with said optical fiber after steps (ii) and (iii).

25. The method of claim 24, wherein steps (i) and (iv) are performed using circulators.

26. The method of claim 24, wherein steps (i) and (iv) are performed using a configuration of two or more bandsplitters.

27. The method of claim 26, wherein said bandsplitters comprise a first-band pass bandsplitter and a second-band pass bandsplitter, each bandsplitter comprises a reflective port, a transmission port and a common a port, and wherein step (i) comprises splitting said first-band signals from said optical fiber using the reflective port of said second-band pass bandsplitter and splitting said second-band signals from said optical fiber using the reflective port of said- first-band pass bandsplitter; and step (iv) comprises combining said split first-band signals with said optical fiber using the transmission port of said first-band pass bandsplitter and combining said split second-band signals with said optical fiber using the transmission port of said second-band pass bandsplitter.

28. The method of claim 27, wherein step (ii) comprises using isolators to isolate said split first-band and second-band signals.

29. The method of claim 22, wherein step (b) comprises:
(i) splitting said first-band signals and said second-band signals onto discrete fibers;
(ii) filtering BRS on each of said discrete fibers;
(iii) band amplifying each signal band on each discrete fiber; and
(iv) combining said first-band signals and said second-band signals on said optical fiber after steps (ii) and (iii).

30. An undersea cable system comprising:
an undersea cable comprising at least one optical fiber for supporting counter-propagating signals of different bands;

a plurality of amplifier systems, each system comprising:
 combining optics coupled to said optical fiber and being adapted for splitting said counter-propagating signals of different bands onto separate transmission paths, and for combining said signals from said separate transmission paths onto said optical fiber after amplification;
 BRS reducing optics for reducing BRS of one or more of said signals; and at least one band amplifier for band amplifying said signals;
wherein one band is the C-band and another band is the L-band.

31. The cable system of claim 30, wherein said splitting/combining optics comprise at least a first-band pass bandsplitter and a second-band pass bandsplitter interconnected by connecting fibers.

32. The cable system of claim 31, wherein an end of a first section of said optical fiber is coupled to a reflective port of said second-band pass bandsplitter and an end of a second section of said optical fiber is coupled to a reflective port of said first-band pass bandsplitters;
 wherein said connecting fibers provide a transmission path from said reflective port of second-band pass bandsplitter to a transmission port of first-band pass bandsplitter and a transmission path from said reflective port of said first-band pass bandsplitter to a transmission port of said second-band pass bandsplitter; and
 wherein said second-band pass bandsplitter is upstream of said first signal pass bandsplitter relative to the propagation of said first band signal.

33. The cable system of claim 32, wherein said BRS reducing optics comprises one or more isolators on each of said transmission paths.

34. The cable system of claim 33, wherein BRS reducing optics further comprises filters on one or more of said transmission paths.

35. The cable system of claim 30, wherein the splitter/combining optics comprises circulators.

36. The cable system of claim 30, wherein said submarine cable system comprises at least 20 cascaded amplification systems.

37. The cable system of claim 30, wherein said system further comprises a cable landing station connected to each end of said fiber, where said stations are at least about 1,000 km apart.

38. The cable system of claim 30, wherein said optical cable is at least about 1,000 km in length.

* * * * *